(12) United States Patent
Eleftheriou et al.

(10) Patent No.: US 8,094,397 B2
(45) Date of Patent: Jan. 10, 2012

(54) SYSTEM, METHOD, AND COMPUTER PROGRAM PRODUCT FOR CHARACTERIZING MEDIA ASSOCIATED WITH DATA STORAGE CHANNELS

(75) Inventors: Evangelos S. Eleftheriou, Rueschlikon (CH); Robert Allen Hutchins, Tucson, AZ (US); Hisato Matsuo, Kanagawa (JP); Sedat Oelcer, Kilchberg (CH)

(73) Assignee: International Business Machines Corporation, Armonk, NY (US)

( * ) Notice: Subject to any disclaimer, the term of this patent is extended or adjusted under 35 U.S.C. 154(b) by 185 days.

(21) Appl. No.: 12/350,108

(22) Filed: Jan. 7, 2009

(65) Prior Publication Data

US 2010/0172047 A1 Jul. 8, 2010

(51) Int. Cl.
*G11B 5/09* (2006.01)
(52) U.S. Cl. ............................................. 360/39; 360/53
(58) Field of Classification Search .................. None
See application file for complete search history.

(56) References Cited

U.S. PATENT DOCUMENTS

| | | | |
|---|---|---|---|
| 4,428,064 A | 1/1984 | Hempy et al. ................. | 364/900 |
| 5,051,846 A * | 9/1991 | Tsushima et al. ............. | 386/320 |
| 5,790,746 A * | 8/1998 | Kashida et al. ............... | 386/241 |
| 5,793,547 A * | 8/1998 | Fujii et al. ........................ | 360/39 |
| 7,286,441 B1 | 10/2007 | White et al. ................... | 365/233 |
| 7,433,142 B2 * | 10/2008 | Bui et al. ......................... | 360/46 |
| 2005/0216814 A1 | 9/2005 | Thomas ......................... | 714/758 |

* cited by examiner

*Primary Examiner* — Jason Olson
(74) *Attorney, Agent, or Firm* — Zilka-Kotab, PC

(57) ABSTRACT

A system in one embodiment includes multiple analog inputs for receiving readback signals, an analog to digital converter coupled to each of the analog inputs for converting the readback signals to digital signals, a buffer coupled to outputs of the analog to digital converters for at least temporarily storing the digital signals, and a digital processing section also coupled to outputs of the analog to digital converters for processing the digital signals for reconstructing data therefrom. A method in one embodiment includes receiving multiple channels of analog readback signals from a magnetic head, converting the analog signals in each channel to digital signals, buffering the digital signals, and outputting the buffered digital signals. A method in another embodiment includes receiving a readback waveform from a magnetic storage device, reducing a frequency offset of the readback waveform, and generating a synchronized, oversampled waveform from the readback waveform.

18 Claims, 7 Drawing Sheets

SYSTEM, METHOD, AND COMPUTER PROGRAM PRODUCT FOR CHARACTERIZING MEDIA ASSOCIATED WITH DATA STORAGE CHANNELS

BACKGROUND

The present invention relates to data storage systems, and more particularly, this invention relates to characterizing media for data storage channels.

In magnetic storage systems, data is read from and written onto magnetic recording media utilizing magnetic transducers commonly. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track density on recording tape, and decreasing the thickness of the magnetic tape medium. However, the development of small footprint, higher performance tape drive systems has created various problems in the design of a tape head assembly for use in such systems.

SUMMARY

A system for a magnetic storage device according to one embodiment includes multiple analog inputs for receiving readback signals, an analog to digital converter coupled to each of the analog inputs for converting the readback signals to digital signals, a buffer coupled to outputs of the analog to digital converters for at least temporarily storing the digital signals, and a digital processing section also coupled to outputs of the analog to digital converters for processing the digital signals for reconstructing data therefrom.

A method according to one embodiment includes receiving multiple channels of analog readback signals from a magnetic head, converting the analog signals in each channel to digital signals, buffering the digital signals, and outputting the buffered digital signals.

A method according to another embodiment includes receiving a readback waveform from a magnetic storage device, reducing a frequency offset of the readback waveform, and generating a synchronized, oversampled waveform from the readback waveform.

A computer program product for outputting data in one embodiment includes a computer usable medium having computer usable program code embodied therewith. The computer usable program code includes computer usable program code configured to reduce a frequency offset of a readback waveform received from a magnetic storage device, and computer usable program code configured to generate a synchronized, oversampled waveform from the readback waveform.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

DETAILED DESCRIPTION

Figure 1:
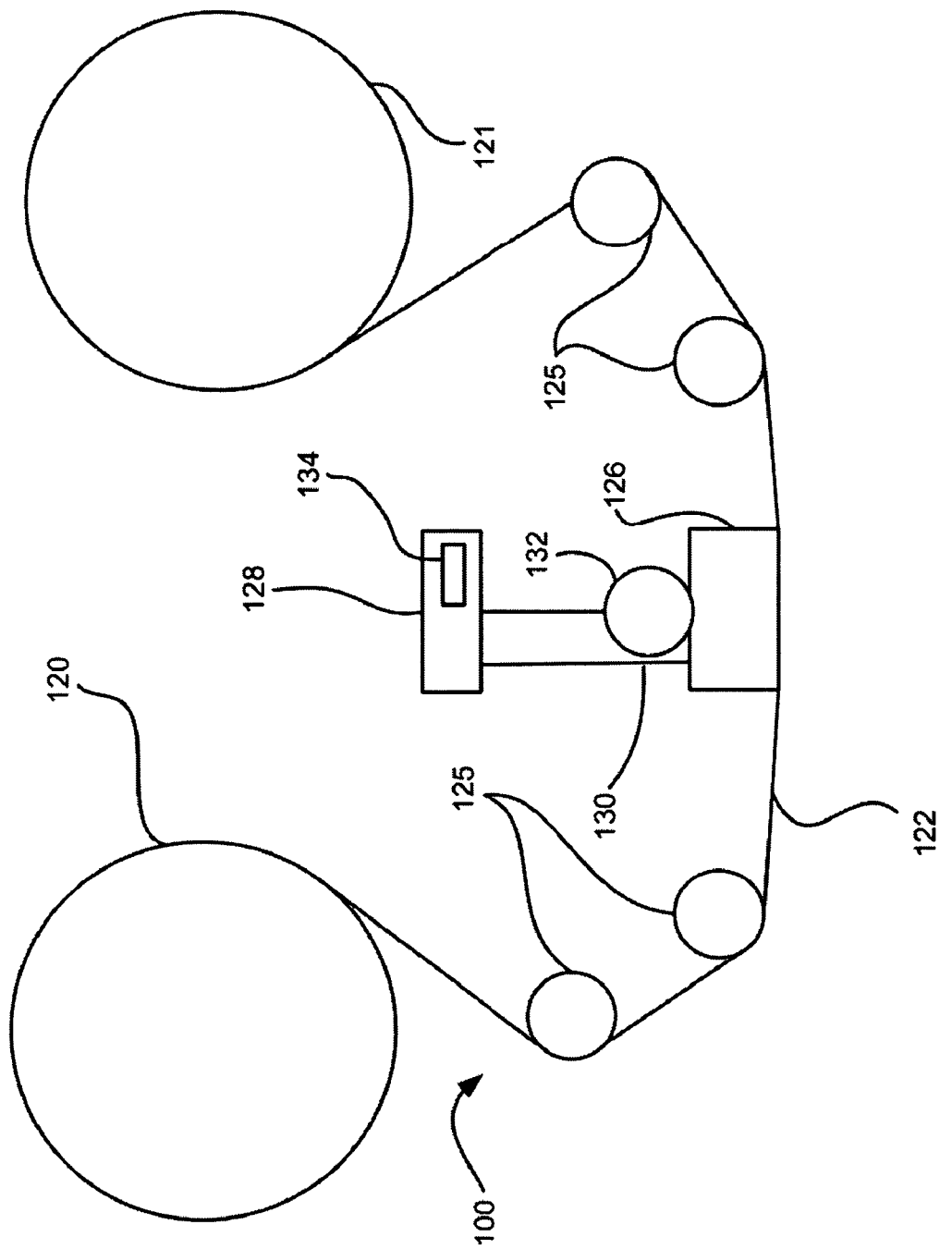
FIG. 1 is a schematic diagram of a simplified tape drive system according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of tape-based storage systems, as well as operation and/or component parts thereof.

In one general embodiment, a system for a magnetic storage device includes multiple analog inputs for receiving a readback signal, an analog to digital converter coupled to each of the analog inputs for converting the readback signals to digital signals, a buffer coupled to outputs of the analog to digital converters for at least temporarily storing the digital signals, and a digital processing section also coupled to outputs of the analog to digital converters for processing the digital signals for reconstructing data therefrom.

In another general embodiment, a method for outputting buffered digital signals is provided in operation, multiple channels of analog readback signals are received from a magnetic head. Additionally, the analog signals in each channel are converted to digital signals. Furthermore, the digital signals are buffered. Still yet, the buffered digital signals are output.

In another general embodiment, a method for generating a synchronized, oversampled waveform from a readback waveform is provided. In operation, a readback waveform is received from a magnetic storage device. Additionally, a frequency offset of the readback waveform is reduced. Furthermore, a synchronized, oversampled waveform is generated from the readback waveform.

In another general embodiment, a computer program product for outputting data is provided, the computer program product comprising a computer usable medium having computer usable program code embodied therewith. Furthermore, the computer usable program code includes computer usable program code configured to reduce a frequency offset of a readback waveform received from a magnetic storage device and computer usable program code configured to generate a synchronized, oversampled waveform from the readback waveform.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 illustrates a simplified tape drive 100 of a tape-based data storage system, which may be employed in the context of the present invention. While one specific implementation of a tape drive is shown in FIG. 1, it should be noted that the embodiments described herein may be implemented in the context of any type of tape drive system.

As shown, a tape supply cartridge 120 and a take-up reel 121 are provided to support a tape 122. One or more of the reels may form part of a removable cassette and are not necessarily part of the system 100. The tape drive, such as that illustrated in FIG. 1, may further include drive motor(s) to drive the tape supply cartridge 120 and the take-up reel 121 to move the tape 122 over a tape head 126 of any type.

Guides 125 guide the tape 122 across the tape head 126. Such tape head 126 is in turn coupled to a controller assembly 128 via a cable 130. The controller 128, e.g., processor, typically controls head functions such as servo following, writing, reading, etc. and may be in communication with a computer-readable medium 134 such as a memory. The cable 130 may include read/write circuits to transmit data to the head 126 to be recorded on the tape 122 and to receive data read by the head 126 from the tape 122. An actuator 132 controls position of the head 126 relative to the tape 122.

An interface may also be provided for communication between the tape drive and a host (integral or external) to send and receive the data and for controlling the operation of the tape drive and communicating the status of the tape drive to the host, all as will be understood by those of skill in the art. Moreover, the tape drive 100 may form part of a tape library system comprising a plurality of drives.

The optimized design of read channels for storage systems such as tape-drive systems requires an accurate characterization of the physical recording channel. The characterization may include the determination of quantities such as the channel frequency response, the properties of the noise processes, the amount of available signal-to-noise ratio, the amount and nature of nonlinear distortion present in the readback signals, etc. The characterization often involves collecting samples of the readback signal at the input of the read channel and processing these samples.

In some cases, it is expensive and cumbersome to achieve faithful channel characterization. For example, one approach that may be used includes sampling the readback signal utilizing a digital scope. In this case, the sampling rates needed must be significantly higher than the bit rate in order to achieve sufficient accuracy in the characterization process.

These sampling rates may exceed the capability of the instrumentation employed. Even if these high sampling rates can practically be achieved, the capture of long readback waveforms at very high sampling rates requires very large memory buffers. This calls for expensive lab instruments. Furthermore, data collection may be cumbersome because of the very high number of captures required for a satisfactory channel analysis.

In addition, in multichannel systems such as tape systems, a number of channels may operate in parallel (e.g. 16, 32, etc.) resulting in a complex implementation and a high capture time. In any case, the signal samples stored in the memory of the digital scope memory may eventually be off-loaded to a host computer for further processing.

The processing that takes place in the host computer to analyze the properties of the recording channel may be carried out accurately only if the captured waveforms are well synchronized in time. In many cases, however, the sampling process with the employed laboratory instrument is not phase-locked to the readback analog signal, resulting in sampling frequency offsets that render the processing for channel characterization problematic. For this reason, these approaches are limited to processing some short portions of the captured waveforms over which frequency modulation effects can be neglected. However, the results of the characterization that can be achieved in that manner are limited. It is therefore desirable to implement a more efficient technique for characterizing media associated with data storage channels.

Figure 2:
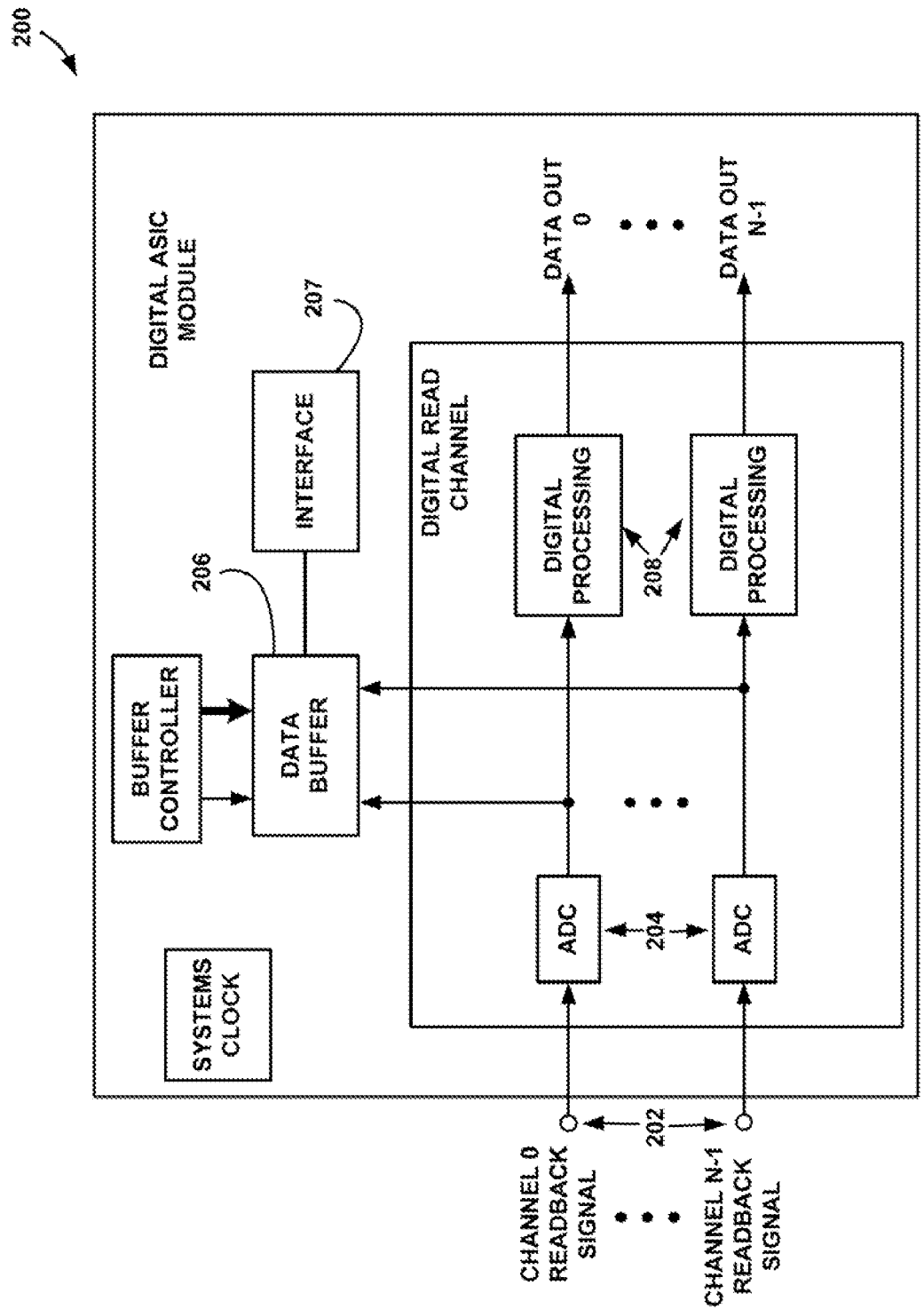
FIG. 2 shows a system for a magnetic storage device for characterizing media associated with data storage channels, in accordance with one embodiment.

FIG. 2 shows a system 200 for a magnetic storage device for characterizing media associated with data storage channels, in accordance with one embodiment. As an option, the present system 200 may be implemented in the context of the details of FIG. 1. Of course, however, the system 200 may be implemented in any desired environment.

As shown, the system 200 includes multiple analog inputs 202 for receiving readback signals. The readback signals may include signals from one or more channels of a magnetic storage device. Additionally, in one embodiment, processing may be performed on the signals prior to reaching the analog inputs 202.

In another embodiment, the processing may be performed on the signals after reaching the analog inputs 202. In still another embodiment, the processing may be performed on the signals before and after reaching the analog inputs 202. In these cases, the processing may include any type of processing, such as gain adjustment, filtering, etc.

As shown further, at least one analog to digital converter 204 is also provided. The analog to digital converters 204 are coupled to each of the analog inputs 202 for converting the analog readback signals to digital signals. The analog to digital converters 204 need not be phase-locked to the timing of the analog input 202 signals but may be clocked by a free running clock or free running clocks. Furthermore, at least one buffer 206 is coupled to outputs of the analog to digital converters 204 for at least temporarily storing the digital signals. As an option, the buffer 206 may store the digital signals directly output by the analog to digital converters 204.

The buffer 206 may include any device capable of storing data. For example, in various embodiments, the buffer 206 may include random access memory (RAM) such as synchronous dynamic random access memory (SDRAM), single data rate (SDR) SDRAM, double data rate (DDR) SDRAM, etc.

The system 200 also includes at least one digital processing section 208. The digital processing section 208 is also coupled to outputs of the analog to digital converters 204 for processing the digital signals for reconstructing data therefrom. It should be noted that, in various embodiments, the system 200 may be embodied on a single chip or multiple chips.

Furthermore, the system 200 of FIG. 2 may be implemented in conjunction with a magnetic storage device such as that shown in FIG. 1. For example, in one embodiment, the system 200 may further include a magnetic head 126 (FIG. 1), a drive mechanism for passing a magnetic medium over the magnetic head 125 (FIG. 1), and a controller 128 (FIG. 1) electrically coupled to the magnetic head.

In operation, multiple channels of analog readback signals may be received from the magnetic head. The analog signals in each channel may then be converted to digital signals. Additionally, the digital signals may be buffered and the buffered digital signals may be output. As an option, the digital signals may be processed for reconstructing data therefrom. Furthermore, these steps may be performed using the system 200 implemented on a single chip or multiple chips.

Thus, a buffer (e.g. an SDRAM buffer, etc.) may be integrated within a tape drive, thereby facilitating the capability to capture readback waveforms in an inexpensive and efficient manner. The buffer enables the ability to collect large amounts of tape data across all the channels, without the use of external devices and interface issues, etc.

Furthermore, the characteristics of the magnetic recording channel may be determined by employing the signal samples captured in the buffer. This data may be transferred from the tape drive to a host computer via an appropriate interface 207

(e.g. a fiber channel port, etc.) where a channel analysis technique may be implemented. In this way, operation on nonsynchronous signal samples taken with a low upsampling factor is possible. Additionally, the sampling ratio may be set to one such that no upsampling is performed.

Accordingly, rather than relying on laboratory instruments for waveform capture, the buffer integrated within the tape drive may be utilized. The buffer may be used as a device to store the signal samples at the input of the read channel. In this way, besides avoiding the need for any external signal capture equipment, the same signal samples as those input to the digital processing section 208 are capable of being stored for subsequent analysis.

Additionally, since the signal characterization does not require a high amount of oversampling, it is sufficient to store the samples obtained at the read channel analog to digital conversion rate. This makes it also possible to store long waveforms of the readback samples.

Still yet, the signal samples of all the parallel channels may be simultaneously stored in the buffer, thereby avoiding the tedious capture and time alignment issues of multichannel data with external lab equipment. Moreover, because every drive may include an integrated buffer-based waveform storage, it is possible to use the in-drive buffer to capture samples of the tape readback signals for problematic drives encountered in the field. This enables an efficient off-line diagnostic and channel characterization capability.

It should be noted that, in one embodiment, when no data is being collected for analysis purposes, the buffer may be made available to assist various other tape drive functions. For example, the data collected in the buffer may be transferred from the drive to a host computer via an appropriate interface 207 (e.g. a fiber channel port, etc.).

Figure 3:
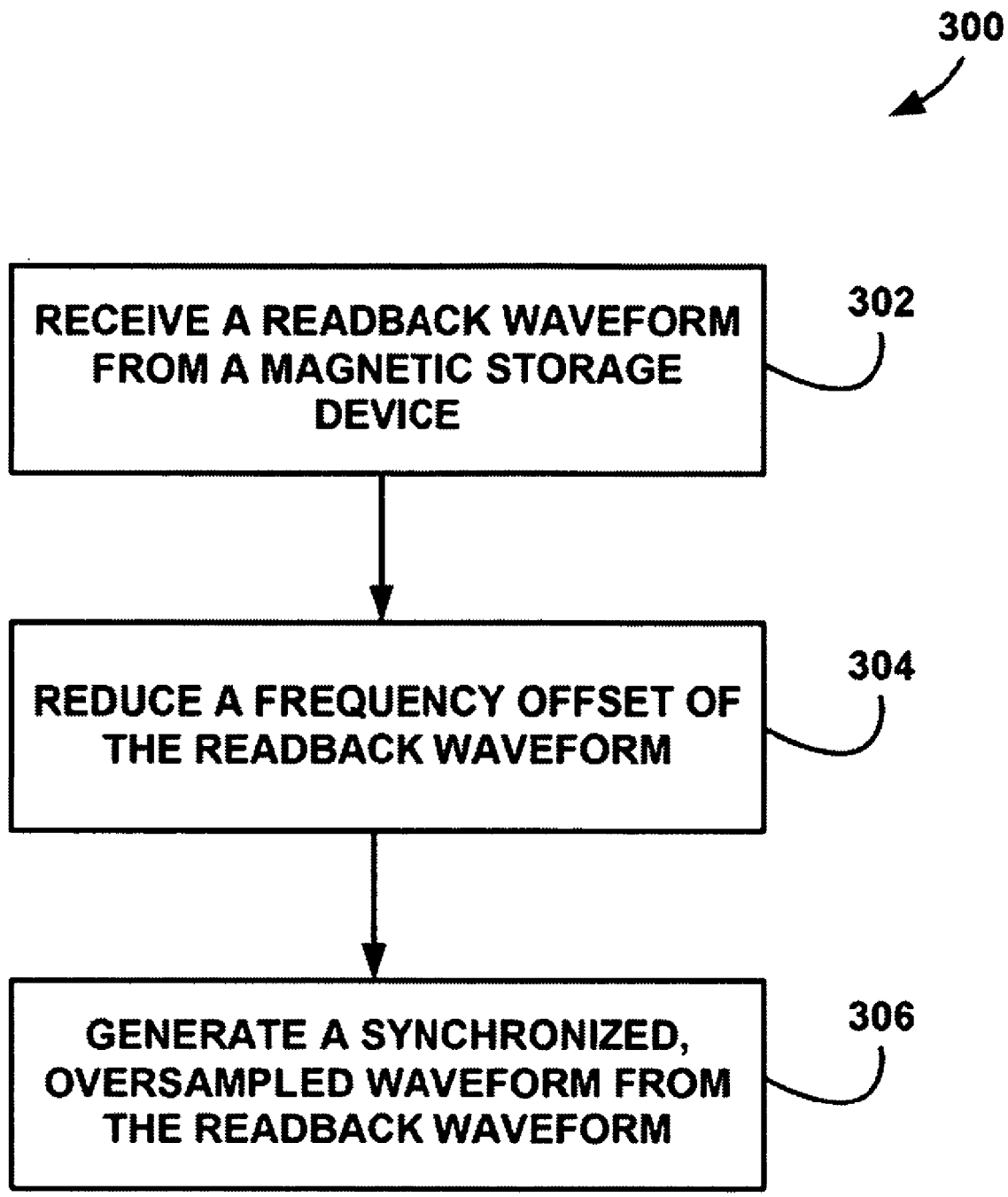
FIG. 3 shows a method for generating a synchronized, oversampled waveform from a readback waveform, in accordance with one embodiment.

FIG. 3 shows a method 300 for generating a synchronized, oversampled waveform from a readback waveform, in accordance with one embodiment. As an option, the present method 300 may be implemented in the context of the functionality and architecture of FIGS. 1-2. Of course, however, the method 300 may be carried out in any desired environment. For example, the method may be performed by a host in communication with a magnetic storage device. In another approach, the method may be performed on a magnetic storage device, with results thereof sent to a host for further analysis and/or processing.

As shown, a readback waveform is received, e.g., from a magnetic storage device. See operation 302. In one embodiment, the readback waveform may correspond to pseudo-random binary sequence data. As an option, the readback waveform may be stored in a buffer on the magnetic storage device.

Additionally, a frequency offset of the readback waveform is reduced. See operation 304. In one embodiment, the frequency offset of the readback waveform may be reduced using a feedback loop. In this case, the feedback loop may include a phase locked loop.

Furthermore, a synchronized, oversampled waveform is generated from the readback waveform. See operation 306.

In one embodiment, a noise from the synchronized, oversampled waveform may be extracted and a whitening technique may be performed on the noise.

As an option, a signal-to-noise ratio may be estimated using this synchronized, oversampled waveform. As another option, the synchronized, oversampled waveform may be utilized for analyzing data dependent characteristics of channel noise and/or analyzing nonlinear distortion effects. As yet another option, the synchronized, oversampled waveform may further be utilized for identifying a system transition and dibit response.

Part of the signal processing technique may include both mitigating the frequency offset in the collected waveforms and obtaining waveforms at a sampling rate higher than the rate at which the waveform received in operation 302 was initially sampled. In one embodiment, this may be achieved by a software receiver or software read channel.

Figure 4:
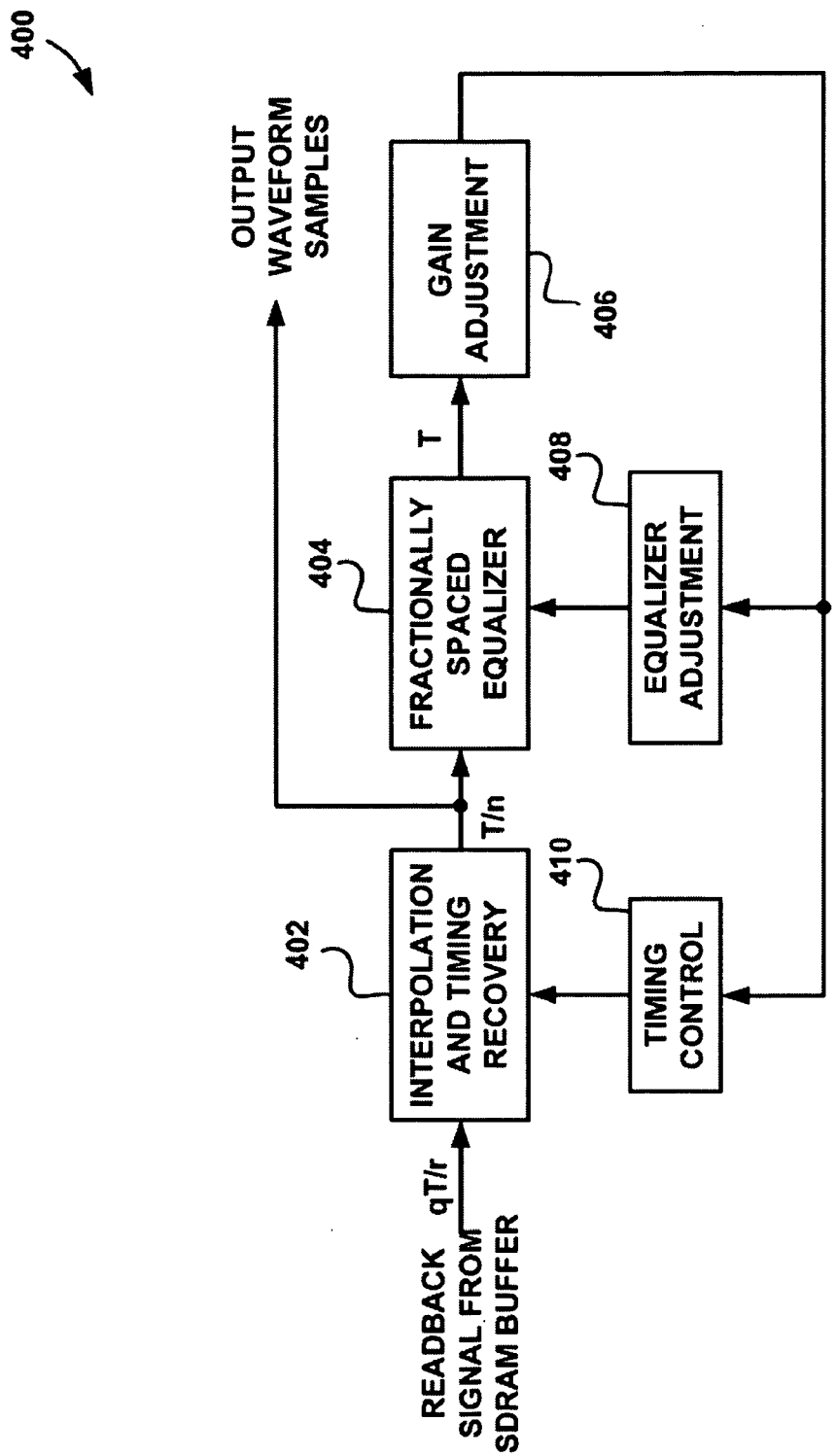
FIG. 4 shows a system capable of performing a signal processing technique used to obtain oversampled, synchronous channel data, in accordance with one embodiment.

FIG. 4 shows a system 400 capable of performing a signal processing technique used to obtain oversampled, synchronous channel data, in accordance with one embodiment. As an option, the present system 400 may be implemented in the context of the details of FIGS. 1-3. Of course, however, the system 400 may be implemented in any desired environment.

In operation, an interpolation and timing recovery module 402 may receive a readback signal channel from a buffer at a signal spacing of T. As shown, the signal spacing T may also be modified by a ratio q/r, where q and r are integers, with $q \leq r$. The interpolation and timing recovery module 402 outputs a signal that is oversampled by a factor of n, where n equals the number of samples per T. In this case, n may be set equal to any integer value that is considered adequate (e.g. n=2, 4, 5, 8, 10, etc.).

The interpolation and timing recovery module 402 output may function as an input for a fractionally spaced equalizer 404. The output of the fractionally spaced equalizer 404 is obtained with a signal spacing of T and may then be gain adjusted by a gain adjustment module 406, and the gain adjusted output may serve as an input to an equalizer adjustment module 408 and a timing control module 410.

Thus, the system 400 may be utilized to process at least one readback waveform captured by the buffer. The system 400 may then operate as a synchronous read-channel architecture in order to resample and interpolate the waveform samples collected in a drive. A phase-locked-loop that is being realized by the timing control function module 410 that controls the interpolation and timing recovery module 402 may be utilized to ensure that a remaining frequency offset in the output signal is negligibly small.

As a result of this first step, the obtained output signal at a rate n/T is a synchronized and oversampled version of the readback signal. In some cases, an interpolation function that is part of the interpolation and timing recovery module 402 may introduce a negligible amount of distortion in the signal characteristic.

Once the synchronized and oversampled version of the readback signal is obtained, the signal-to-noise ratio (SNR) of the readback waveform may be estimated (i.e. the channel SNR) using the synchronized and oversampled signal. Employing this signal for channel SNR estimation ensures that any timing jitter present in the readback signal is removed and does not contribute to the noise power during SNR computations.

In some cases, channel SNR may be estimated when the readback waveform corresponds to pseudo-random binary sequence (PRBS) data. In this case, the readback waveform may be considered over P consecutive periods, each period containing nM samples, where M denotes the period of the employed PRBS in units of T.

For example, the signal of the p-th period may be denoted by $x_p(k)$, where k=0, 1, ..., nM−1. The readback signal is first averaged at each time k over these P periods, yielding $x_{av}(k)$, as shown in Equation 1.

$$x_{av}(k) = \frac{1}{P}\sum_{p=0}^{P-1} x_p(k), k = 0, 1, \ldots, nM - 1 \qquad \text{Equation 1}$$

Once the sequence $x_{av}(k)$ is obtained, it is subtracted from each signal sequence $x_p(k)$, yielding P sets of noise sequences $w_p(k)$, as illustrated by Equation 2.

$$w_p(k) = x_p(k) - x_{av}(k), p=0, 1, \ldots P-1; k=0, 1, \ldots, nM-1 \qquad \text{Equation 2}$$

At any given time instant k, the noise variance is obtained, as shown in Equation 3.

$$\sigma_w^2(k) = \frac{1}{P}\sum_{p=1}^{P-1} [w_p(k) - \overline{w}(k)]^2, k = 0, 1, \ldots, nM - 1 \qquad \text{Equation 3}$$

The average noise sequence is obtained as shown in Equation 4.

$$\overline{w}(k) = \frac{1}{P}\sum_{p=0}^{P-1} w_p(k), k = 0, 1, \ldots, nM - 1 \qquad \text{Equation 4}$$

It should be noted that the sequence $\sigma_w^2(k)$ reflects the nonstationarity (i.e. the data dependency) of the noise process. Finally, assuming a zero-mean signal and noise process, the channel SNR may be obtained, as shown in Equation 5.

$$SNR = \frac{\sigma_x^2}{\sigma_w^2} \qquad \text{Equation 5}$$

In this case, $\sigma_x^2$ denotes the power of the signal and $\sigma_w^2$ is the power of the noise, as shown in Equation 6.

$$\sigma_w^2 = \frac{1}{nM}\sum_{k=0}^{nM-1} \sigma_w^2(k) \qquad \text{Equation 6}$$

In addition to obtaining the channel SNR, the sequence of synchronized oversampled signals may be used to analyze the data dependent characteristics of the channel noise process. Furthermore, the sequence of synchronized oversampled signals may be used for other purposes as well, such as the identification of the system transition and dibit response, the analysis of nonlinear distortion effects, etc.

Figure 5:
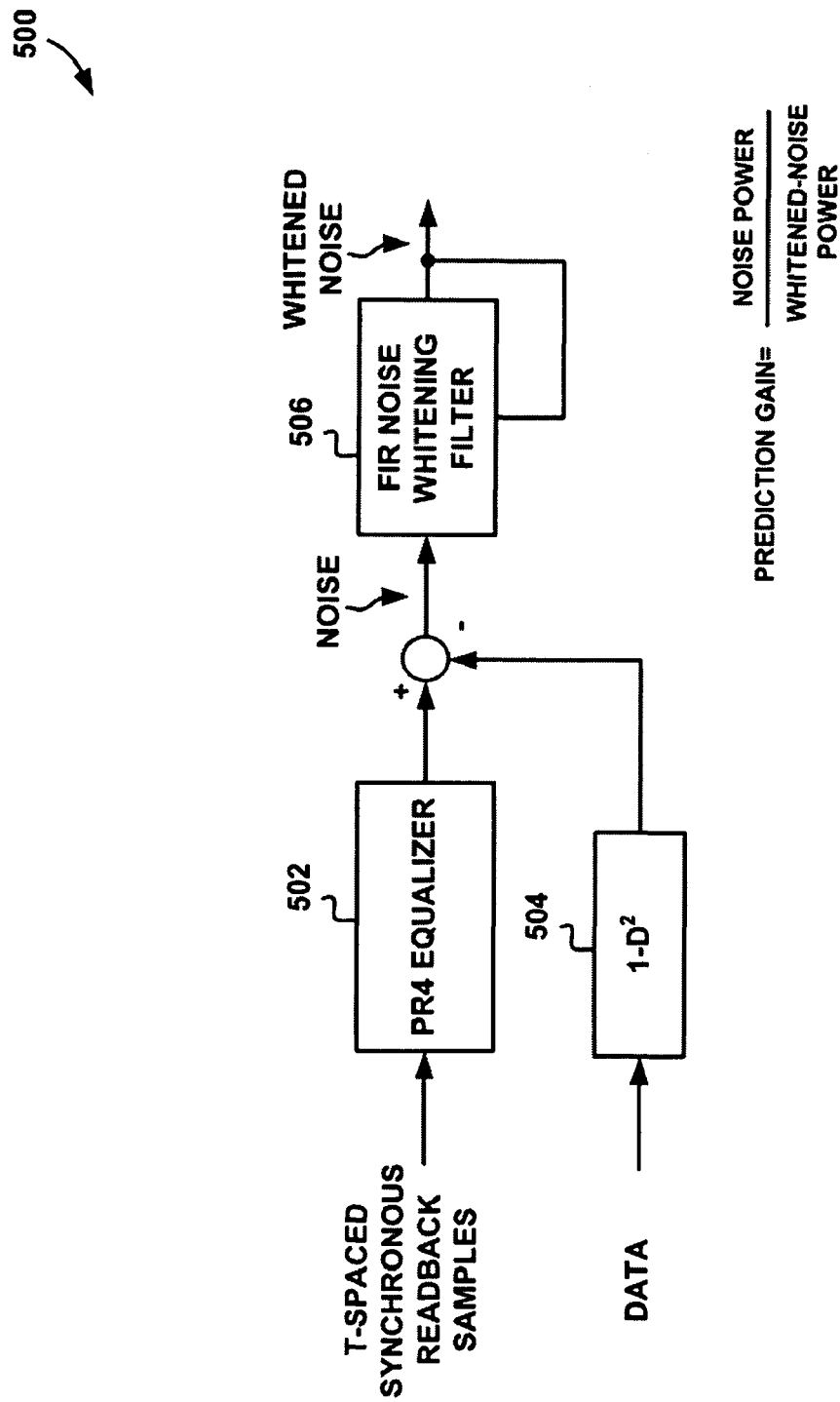
FIG. 5 shows a system for noise prediction analysis, in accordance with one embodiment.

FIG. 5 shows a system 500 for noise prediction analysis, in accordance with one embodiment. As an option, the present system 500 may be implemented in the context of the details of FIGS. 1-4. Of course, however, the system 500 may be implemented in any desired environment.

As shown, T-spaced synchronous readback samples are input into a partial response class 4 (PR4) equalizer 502. The output of the equalizer 502 is the signal plus the noise. Data written to tape is also filtered through an ideal filter 504 (e.g. an ideal PR4 characteristic filter, etc.) and the resulting signal, which is an ideal signal, is subtracted from the output of the PR4 equalizer 502 resulting in an error signal that represents the noise. This noise is then input into a finite impulse response (FIR) noise whitening filter 506. The PR4 characteristic is used to illustrate the noise analysis process in a specific case and can be replaced by any other characteristic that is deemed appropriate within the context of noise prediction.

The noise characterization may be used in a detector design such that performance may be maximized for high linear densities. Performance gains of noise-predictive maximum likelihood (NPML) or data-dependent NPML (DD-NPML) detection may depend on achievable prediction gains. Thus, the equalized readback signal may be whitened using the FIR whitening filter 506 and a prediction gain may be computed by dividing the noise power by the whitened-noise power.

Figure 6:
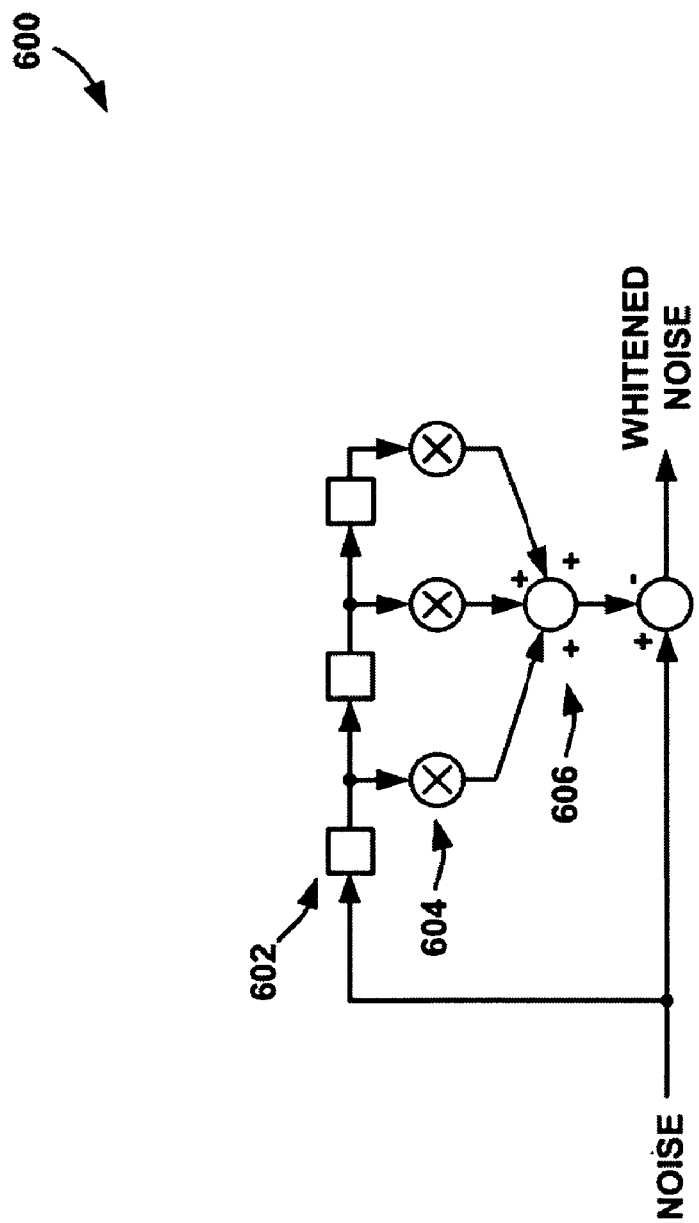
FIG. 6 shows a system for non-data dependent noise-whitening, in accordance with one embodiment.

It should be noted that a whitening filter may be obtained adaptively (e.g. utilizing a least mean squares (LMS) algorithm, etc.) in data dependent (DD) or non-data dependent mode. FIG. 6 shows a system 600 for non-data dependent noise-whitening, in accordance with one embodiment. As an option, the present system 600 may be implemented in the context of the details of FIGS. 1-5. Of course, however, the system 600 may be implemented in any desired environment.

As shown, the system 600 may include one or more delay elements 602 and one or more multipliers 604. In operation, noise is input into the system 600 and whitened noise is output. In this case, the noise is input into a series of the delay elements 602, and each output of the delay elements 602 is input into a corresponding multiplier 604.

Each of the multipliers 604 multiply the output of the delay elements 602 by a coefficient and the resulting values are summed utilizing an adder 606. This sum serves as a noise prediction, which is then subtracted from the input noise. As a result, a whitened noise is output.

Figure 7:
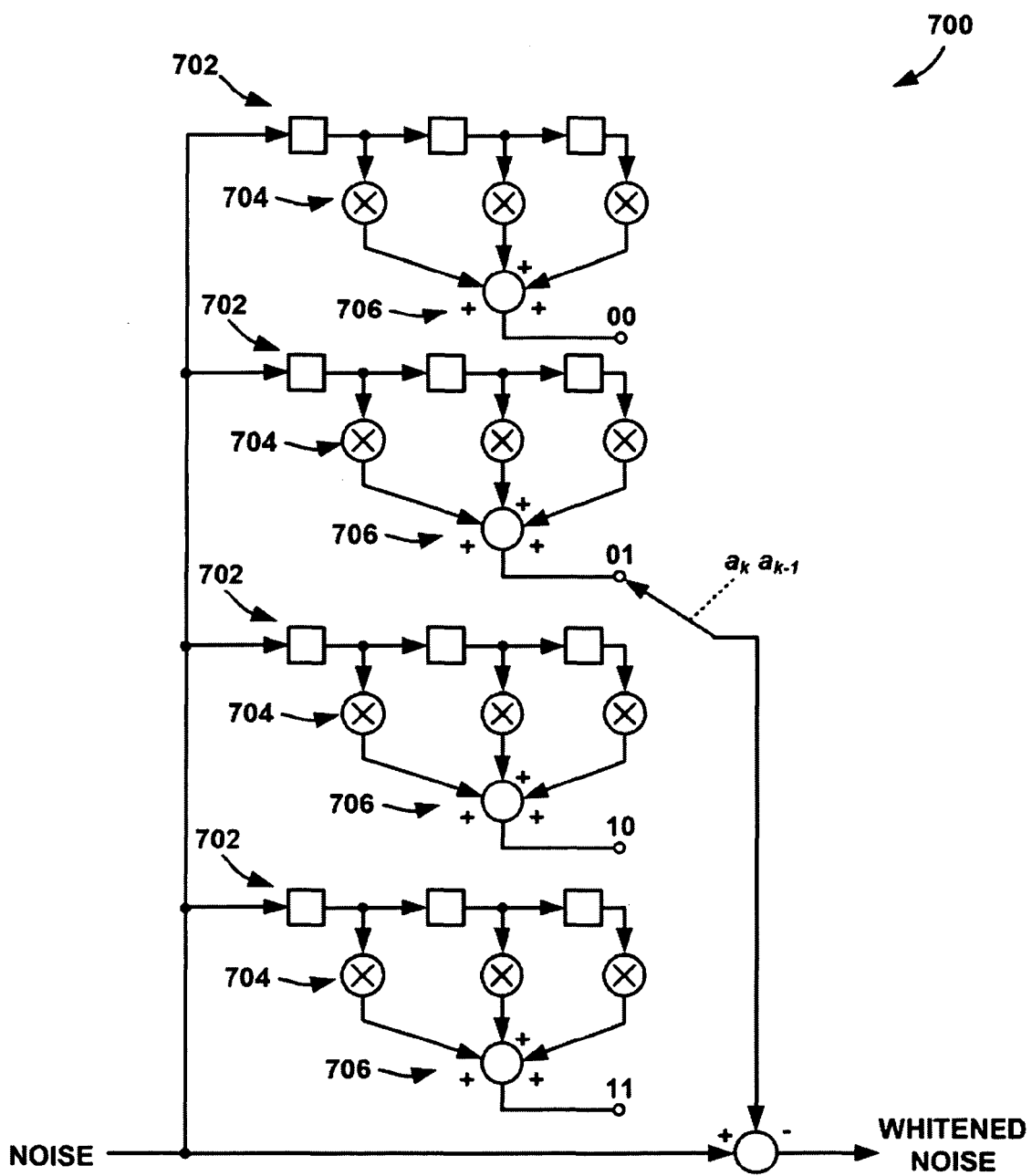
FIG. 7 shows a system for data dependent noise-whitening, in accordance with one embodiment.

FIG. 7 shows a system 700 for data dependent noise-whitening, in accordance with one embodiment. As an option, the present system 700 may be implemented in the context of the details of FIGS. 1-6. Of course, however, the system 700 may be implemented in any desired environment.

As shown, the system 700 may include a plurality of delay elements 702 and a plurality of multipliers 704. In operation, noise is input into the system 700 and whitened noise is output. In this case, the noise is input into a series of the delay elements 702, and each output of the delay elements 702 is input into a corresponding multiplier 704.

Each of the multipliers 704 multiply the output of the delay elements 702 by a coefficient and the resulting values are summed utilizing an adder 706. This sum serves as a noise prediction, which is then subtracted from the input noise. As a result, a whitened noise is output.

It should be noted that, in this example, the data is dependent on a current bit, $a_k$, and a previous bit $a_{k-1}$. At time k, if the written bit is known, then an appropriate filter may be utilized. For example, if $a_k$ and $a_{k-1}$ are equal to "0" and "0," a top branch filter corresponding to the bit "00" may be utilized. In this way, the whitening is dependent on the data. This may be implemented for every bit combination of $a_k$ and $a_{k-1}$.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system for a magnetic storage device, the system comprising:
    multiple analog inputs for receiving readback signals;
    an analog to digital converter coupled to each of the analog inputs for converting the readback signals to digital signals;

a buffer coupled to outputs of the analog to digital converters for at least temporarily storing the digital signals; and a digital processing section also coupled to outputs of the analog to digital converters in parallel with the buffer, the digital processing section being for processing the digital signals for reconstructing data therefrom.

2. A system as recited in claim 1, wherein the system is embodied on a single chip.

3. A system as recited in claim 1, wherein the buffer comprises random access memory.

4. A system as recited in claim 1, wherein the buffer stores the digital signals directly output by the analog to digital converters.

5. A system as recited in claim 1, further comprising a magnetic head, a drive mechanism for passing a magnetic medium over the magnetic head, and a controller electrically coupled to the magnetic head.

6. A system as recited in claim 1, further comprising an interface coupled to the buffer for transferring data from the buffer to a host system.

7. A system as recited in claim 6, wherein the reconstructed data is also transferred to the host computer.

8. A method, comprising:

receiving multiple channels of analog readback signals from a magnetic head;

converting the analog signals in each channel to digital signals;

buffering the digital signals;

outputting the buffered digital signals to an interface for transferring data corresponding to the buffered digital signals to a host system; and processing the digital signals for reconstructing data therefrom, wherein the digital signals are processed for reconstructing data therefrom using a digital processing section, wherein the digital processing section receives the digital signals in parallel with a buffer performing the buffering.

9. A method as recited in claim 8, wherein the digital signals being buffered are received directly from outputs of analog to digital converters.

10. A method as recited in claim 8, wherein the steps are performed by a single chip.

11. A method as recited in claim 8, further comprising also transferring the reconstructed data to the host system.

12. A method, comprising:

receiving a readback waveform of readback signals from a magnetic storage device via multiple analog inputs adapted for receiving the readback signals;

converting the readback signals to digital signals using an analog to digital converter coupled to each of the analog inputs;

at least temporarily storing the digital signals using a buffer coupled to outputs of the analog to digital converters;

processing the digital signals for reconstructing data therefrom using a digital processing section also coupled to outputs of the analog to digital converters in parallel with the buffer;

reducing a frequency offset of the readback waveform; and generating a synchronized, oversampled waveform from the readback waveform.

13. A method as recited in claim 12, wherein the frequency offset of the readback waveform is reduced using a feedback loop.

14. A method as recited in claim 13, wherein the feedback loop is a phase locked loop.

15. A method as recited in claim 12, further comprising estimating a channel signal-to-noise ratio using the synchronized, oversampled waveform.

16. A method as recited in claim 12, wherein the readback waveform is stored in a buffer on the magnetic storage device.

17. A computer program product for outputting data, the computer program product comprising:

a non-transitory computer usable medium having computer usable program code embodied therewith, the computer usable program code comprising:

computer usable program code configured to receive multiple channels of analog readback signals from a magnetic head;

computer usable program code configured to reduce a frequency offset of a readback waveform of the readback signals received from a magnetic storage device;

computer usable program code configured to generate a synchronized, oversampled waveform from the readback waveform;

computer usable program code configured to convert the analog signals in each channel to digital signals;

computer usable program code configured to control buffering of the digital signals;

computer usable program code configured to cause output the buffered digital signals to an interface for transferring data corresponding to the buffered digital signals to a host system; and computer usable program code configured to process the digital signals for reconstructing data therefrom, wherein the digital signals are processed for reconstructing data therefrom using a digital processing section, wherein the digital processing section receives the digital signals in parallel with a buffer performing the buffering.

18. A method, comprising:

receiving multiple channels of analog readback signals from a magnetic head;

converting the analog signals in each channel to digital signals;

buffering the digital signals; and outputting the buffered digital signals to an interface for transferring data corresponding to the buffered digital signals to a host system; and processing the digital signals for reconstructing data therefrom, wherein the same digital signal samples as those received by a digital processing section performing the processing are stored in the buffer for subsequent analysis in the host system.

* * * * *